March 10, 1964  E. BOHNET  3,124,025

STOP ATTACHMENT FOR METAL LATHES

Filed March 26, 1962

INVENTOR

EMIL BOHNET

BY Shoemaker and Mattare

ATTORNEYS 3,124,025
STOP ATTACHMENT FOR METAL LATHES
Emil Bohnet, 204 Ontario St., Buffalo, N.Y.
Filed Mar. 26, 1962, Ser. No. 182,252
8 Claims. (Cl. 82—34)

This invention relates to metal cutting lathes and is directed particularly to an improved stop attachment designed to fit in the head stock spindle.

A particular object of the present invention is to provide a new lathe stop, designed particularly for use in association with the lathe chuck, which, when once adjusted and positioned in the head stock spindle, does not require any further adjustments after the chuck has been placed on the spindle.

Another object of the invention is to provide a lathe stop of improved design which permits fine and accurate adjustments whereby a very accurate depth of cut may be effected in the operation of facing machine parts while the latter are held or clamped in the lathe chuck.

Still another object of the invention is to provide a new lathe stop tapered to fit in the head stock spindle and providing, when adjusted, an accurate surface or face against which the work piece is pressed while it is held by the jaws of the lathe chuck, and which stop, by reason of its taper seating in the head stock spindle, rotates in perfect concentricity with the spindle.

The work stop of the present invention is inserted in the lathe stock spindle and provides a stop face or surface exactly perpendicular to the axis of the spindle, against which a piece of work bears or presses when the work is introduced between and clamped in position by the lathe chuck jaws. The stop, however, forms no part whatever of the lathe chuck and when once in position permits the lathe chuck to be applied and removed as desired. However, the construction of the stop is such that adjustment can be readily made for determining the depth of cut to be made in a piece of work held in the chuck and such adjustments may be made while the work is in the lathe.

The invention will be best understood from a consideration of the following detailed description taken in connection with the accompanying drawing, wherein.

Figure 1:
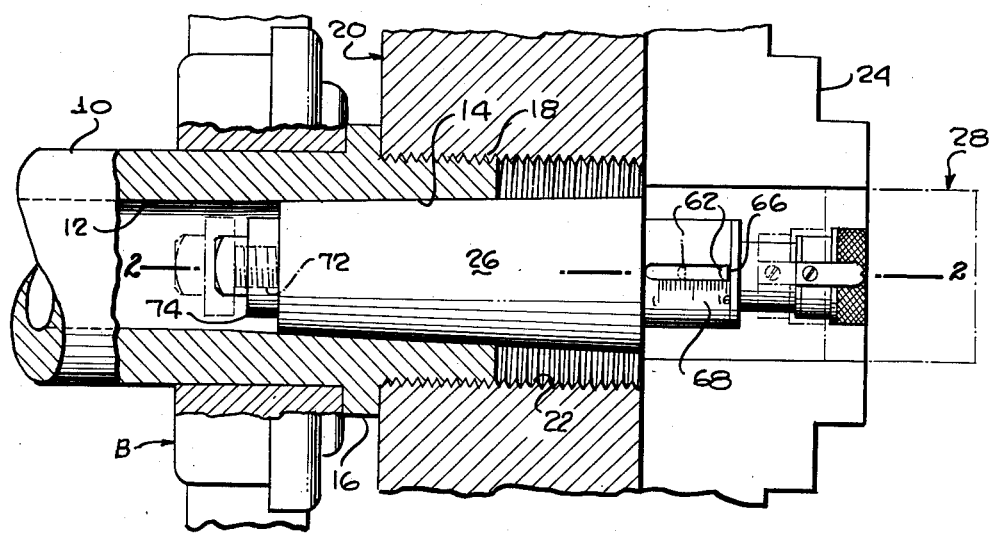
FIG. 1 is a view partly in section and partly in elevation of the forward end of a machine lathe spindle and a chuck mounted thereon and showing the lathe stop of the present invention mounted in the spindle and in elevation and also showing the stop in its closed position, with an open position of the stop being indicated in broken lines.
Figure 2:
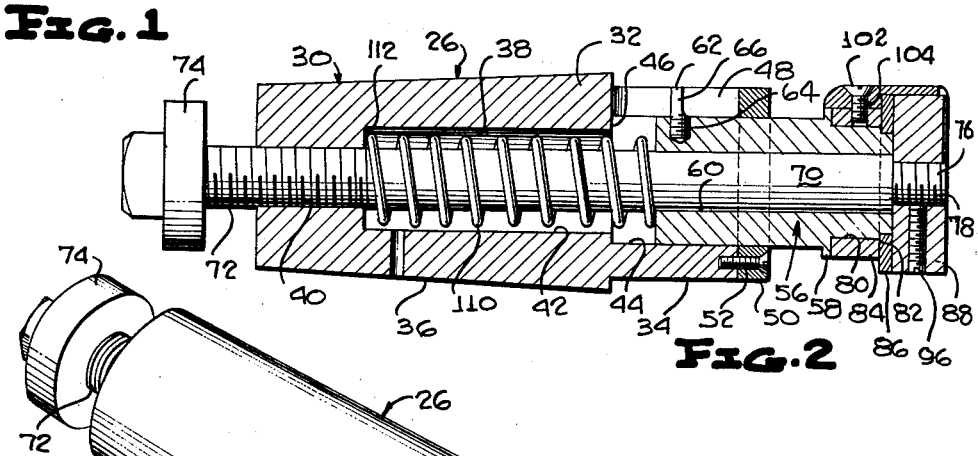
FIG. 2 is a central longitudinal section taken substantially on the line 2—2 of FIG. 1 but showing the stop set or adjusted to open position.
Figure 3:
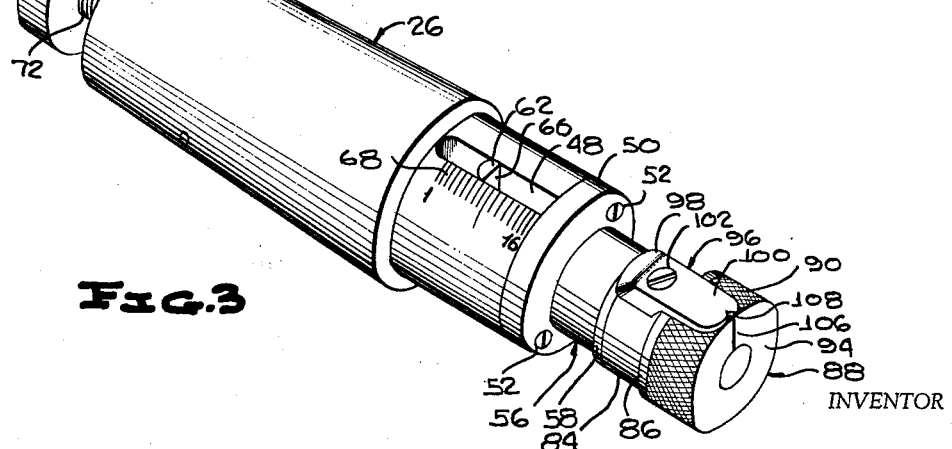
FIG. 3 is a view in perspective of the invention showing the same set in the open position.

Referring now more particularly to the drawings, there is illustrated a portion of the forward end of the head stock spindle of a machine lathe.

This forward end portion of the spindle is generally designated 10, and as shown, the same is partly in elevation and partly in longitudinal section. Thus there is shown the bore 12 which extends axially through the spindle and which is provided at its forward end with the tapered socket 14, which taper may be a standard taper, such for example, a Morse taper. This is conventional construction.

The spindle is mounted at its forward end in a suitable bearing which is generally designated B and which is carried by the machine frame as is well known.

Adjacent to its forward end the spindle 10 is flanged as indicated at 16, and from the flange to the forward end the spindle is externally screw threaded as indicated at 18.

The numeral 20 generally designates a portion of a chuck which is shown in radial section and which has the threaded bore 22 whereby it may be threadedly mounted on the spindle.

The numeral 24 designates conventional jaws for the chuck.

All of the structure thus far illustrated and described is standard and forms no part of the present invention.

The lathe stop of the present invention is generally designated 26.

In FIG. 1 of the drawing the stop is shown set in the tapered forward end portion 14 of the spindle bore.

The stop in the position shown in FIG. 1 is closed, that is, the forward end portion extends to the front of the chuck jaws and when the stop is in this position it may be readily removed from the spindle, as hereinafter more clearly described, without injury, by means of a rod or bar inserted from the rear end of the spindle to engage the inner end of the stop.

The stop is also illustrated in FIG. 1 with parts thereof in broken outline to show the stop head, hereinafter described, in an adjusted position and in such position the stop is open so that the chuck jaws 24 may receive a piece of work. Such a piece of work is also shown in broken lines and is designated 28. When the piece of work is in place between the chuck jaws it will bear against the hereinafter described face or surface of the head portion of the stop.

The stop 26 comprises a relatively long guide sleeve body 30 which is formed to provide the tapered rear end portion 32 and the forward neck portion 34.

The tapered surface of the rear end portion is designated 36. This taper may be of the well known Morse form, with the taper conforming to that of the spindle socket, whereby the body 30 when inserted into the forward end of the spindle will seat firmly therein.

The guide sleeve body 30 has a passage or bore extending throughout the length thereof as indicated at 38. This passage or bore is here shown as having a rear or back end portion 40 leading into a portion 42 of larger diameter which, in turn, leads into the forward end portion 44 which is of major diameter.

Between the middle or intermediate portion 42 and the forward end portion 44 there is formed an annular stop shoulder 46.

The portion 44 of the bore 38 extends through the length of the neck portion 34 and this neck portion is provided with a longitudinal wall slot 48 which opens through the forward end of the neck portion as shown.

An annular plate 50 is positioned against the forward end of the neck portion 34 and closes the slot 48 as shown. Screws 52 or other suitable means secure the plate 50 to the end of the neck portion 34. This plate 50 is of an outside diameter substantially the same as the outside diameter of the neck portion 34 and is in the form of an annulus having an opening 54 which is of the same diameter as the forward end portion 44 of the bore.

The numeral 56 generally designates a sliding sleeve. The sliding sleeve 56 is of an outside diameter to fit snugly in the portion 44 of the bore 38 and to fit smoothly in the opening 54 in the plate 50.

This sleeve is designed to have sliding movement in the portion 44 of the bore.

The forward end of the sleeve 56 is of slightly enlarged circumference as indicated at 58 forming a head position as shown.

The sleeve 56 has a bore 60 extending through the length thereof and is of the same diameter as the back or inner end portion 40 of the bore 38.

The sliding sleeve 56 carries a pointer pin 62 which has one end threaded into the socket 64 and this pin extends outwardly through the guide slot 48.

The pin 62 has an index face or surface which faces the plate 50 and is perpendicular to the longitudinal axis of the guide body.

The index face on the forward side of the pin 62 is designated 66 and is aligned transversely of the tool, in the setting thereof, with a selected marking on the index scale 68 which is laid out along one side of the slot 48, on the surface of the neck portion 34 of the body 30. This scale 68 may be graduated in any suitable or desirable manner.

Preferably, the scale may have a length of about 2 inches, divided into 16ths of an inch or less, as may be found desirable.

Extending through the guide sleeve body 30 and through the sliding sleeve 56, is the spindle 70. The spindle is of a diameter to fit snugly in the rear or back end portion 40 of the bore 38 and in the bore 60 of the sliding sleeve as shown. The back end or rear end of the spindle 70 projects beyond the rear end of the body 30 and is screw threaded for a substantial extent of its length as indicated at 72, and has threaded thereon the cap nut 74.

The opposite or forward end of the spindle is of reduced diameter forming the terminal stem portion 76 which is screw threaded as indicated at 78.

The head portion 58 of the sliding sleeve 56 is turned down to form an encircling recess 80. Also the head at the forward end is further slightly reduced in diameter forming the shallow or narrow shoulder 82.

Encircling the head portion 58 and lying in the annular recess 80 is a pointer carrying sleeve 84 and this sleeve is kept in place by a washer 86 which is fitted on the reduced end portion of the head portion 58 and engages against the shoulder 82 as shown.

The threaded stem 76 has threadably mounted thereon a circular head nut 88 which has a relatively wide knurled peripheral surface as indicated at 90, whereby the nut may be conveniently grasped between the fingers to effect the rotation thereof, and also the rotation of the spindle 70 to which it is fixedly secured by means of the set screw 92 which extends radially through the nut and engages at its inner end against the stem 76.

The washer and the knurled nut, 86 and 88 respectively, hold the sleeve 84 in position so that the sleeve while being closely held on the head end portion 58 of the sliding sleeve 56 is not so tightly secured that a mechanic cannot turn the same with the hereinafter described pointer or indicator finger mounted thereon. The sleeve 84, accordingly, might be designated or referred to as the indicator or pointer sleeve. The washer keeps the pointer sleeve in position so that it will not turn accidentally although it may be turned by being pressed with the fingers.

The forward face 94 of the nut is flat and exactly perpendicular to the axis of the spindle 70 and provides the bearing, contact or stop surface against which the workpiece 28 engages when the lathe stop is in working position in the lathe spindle.

The numeral 96 designates an indicator finger which has a relatively thick rear end portion 98 joined to a relatively thin forwardly extending portion 100. This finger is secured to the sleeve 84 by a screw 102 which passes therethrough and into a threaded socket 104 as illustrated.

The forward face 94 of the knurled head 88 has an index mark 106 thereon which is here shown as being in the form of a radially extending groove and the forward end of the indicator finger, which is transversely rounded, as shown, has a notch 108 or other suitable marking in and across the edge thereof with which the index line 106 is designed to be brought into registry.

As illustrated and hereinbefore stated, the screw threads 74 upon the rear end of the spindle 70, extends a substantial length of the spindle and the bore 38, in the smaller back end portion 40 thereof, is screw threaded for threaded engagement with the threads 72. Thus, it will be seen that when the knurled circular head nut 88 is turned, the spindle will be rotated and the threaded coupling between the spindle and the inner or back end of the body 30 will effect longitudinal or axial movement of the spindle and also longitudinal movement of the sliding sleeve 56 together with the pointer pin 62 which the sliding sleeve carries.

The screw threads 72 on the spindle are pitched so that one complete rotation of the head 88 and the spindle, will effect movement of the indexing face 66 of the pin 62, 1/16 of an inch, or any other predetermined extent, in accordance with the linear graduations of the scale 68.

In order to ensure the maintenance of the spindle against any turning movement when the workpiece 28 is in contact with the face of the circular head 80, which would, of course, result in a changing of the setting of the stop, a relatively heavy coil spring 110 encircles the spindle 70 between the shoulder 112 which is formed at the back end of the middle portion 42 of the bore 38, and the rear end of the sliding sleeve 56, bearing at its ends against the shoulder 112 and the rear end of the sliding sleeve, as shown. The spring 110 is always under compression and by its forceful engagement of its ends with the shoulder 112 and the rear end of the sliding sleeve to force the outer end of the latter against the knurled head 88 and it also creates a tight frictional engagement of the threads 72 with the threads in the portion 40 of the bore 38.

As hereinbefore described, and as illustrated by FIG. 1, when the lathe stop is mounted in the forward end of the head stock spindle of a lathe, the chuck 20 may be applied to the lathe spindle in the conventional manner without interference from the stop.

The stop will have previously been set so that the portion thereof forwardly of the portion 32 of the guide sleeve body will be disposed between the working holding jaws 24 of the chuck, but will not be engaged by the jaws. When the workpiece 28 is inserted between the jaws, its inner end will abut the face 98 of the knurled head 88 and will maintain this position when secured by the chuck jaws.

From the foregoing, it will be seen that there is provided by the present invention a relatively simple lathe stop which can be simply and quickly placed into operative position and removed therefrom and will not interfere with the application and removal of the lathe chuck. The lathe stop will enable the mechanic to more readily gauge adjustments to be made in connection with the positioning of the work.

Removal of the lathe stop from the spindle is easily effected by the employment of a knock-out rod inserted into the tubular lathe spindle from the rear end for engagement with the cap nut 74 on the rear end of the spindle 70.

I claim:

1. A lathe stop, comprising an elongate body adapted to be inserted into the forward end of the bored spindle of a lathe head stock, a stop spindle extending through and rotatable in the body, a threaded coupling between the body and stop spindle whereby rotation of the latter spindle in the body effects its axial movement relative to the body, the stop spindle having a forward end, a workpiece engaging head secured to the said forward end of the stop spindle and cooperating index scale and pointer means carried by the body and the stop spindle for relative movement by and upon axial movement of the stop spindle.

2. The invention according to claim 1, wherein said body is formed to have limited movement into the said end of the lathe spindle bore, whereby the said stop spindle head is maintained in a working position forwardly of the adjacent end of the lathe spindle.

3. The invention according to claim 1, wherein said body is tapered through a rear portion of its length to seat against a correspondingly tapered surface of the lathe spindle bore and maintain a forward end portion of the body and the stop spindle head outside of and forwardly of the adjacent end of the lathe spindle.

4. A lathe stop, comprising an elongate body having a tapered rear end portion of substantial length and having a forward end portion, the body having an axial bore therethrough, a sleeve slidably supported in the forward end of said bore, a spindle extending through the bore and having a forward end extending through said sleeve, the spindle having a portion in threaded connection with the bore, means connected to the spindle forwardly of the forward end of the body and sleeve and having operative connection with the sleeve by which to effect manual rotation of the spindle and thereby effect axial movement of the spindle through the medium of the threaded connection of the spindle with the body, spring means biasing said sleeve to maintain said operative connection of the same with the said spindle connected means, means for holding the sleeve against rotation, but permitting said axial movement thereof, and means carried by the sleeve for movement relative to the body for indicating the extent of axial movement of the sleeve relative to the body.

5. The invention according to claim 4, wherein said forward end portion of the body has a longitudinal slot therein and the said means for holding the sleeve against rotation while permitting axial movement thereof includes, with said slot, a pin attached to the sleeve and slidably engaged in the slot.

6. The invention according to claim 4, wherein said means connected to the spindle by which to effect said manual rotation of the spindle comprises a head member secured on the forward end of the spindle, and the said operative connection between the sleeve and the means connected to the spindle comprises rotational engagement of said head member against the forward end of the sleeve.

7. The invention according to claim 6, wherein said head has a forwardly directed face forming a seat for a piece of work chucked to the lathe spindle, an indicator finger, means operatively coupling the finger to said slidable sleeve, the finger extending forwardly across the peripheral portion of the head member, and an indicia means on the head member for coaction with said finger.

8. The invention according to claim 4, wherein the said slidably supported sleeve has a portion of its forward end reduced in diameter to form an encircling recess, a rotatable sleeve engaged in said recess and encircling the slidably supported sleeve, the said means connected to the spindle by which to effect manual rotation of the spindle, comprising a nut threadably engaged on the spindle, a washer encircling the slidably supported sleeve and fixed thereto between said nut and the rotatable sleeve, an indicator finger secured to the said rotatable sleeve and extending therefrom across the periphery of said nut, and indicia means on the nut for cooperation with said finger.

References Cited in the file of this patent

UNITED STATES PATENTS 1,455,554    Stercklen  _____ May 15, 1923

FOREIGN PATENTS 117,624    Sweden _____ Nov. 12, 1946

OTHER REFERENCES

Popular Science, May 1955, page 240, copy available in 279—Stops.